(No Model.)
H. FORMAN.
PLOW OR CULTIVATOR.
No. 521,022.
Patented June 5, 1894.
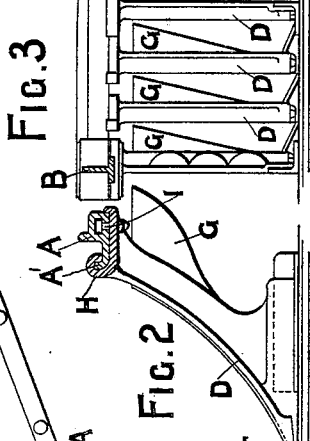
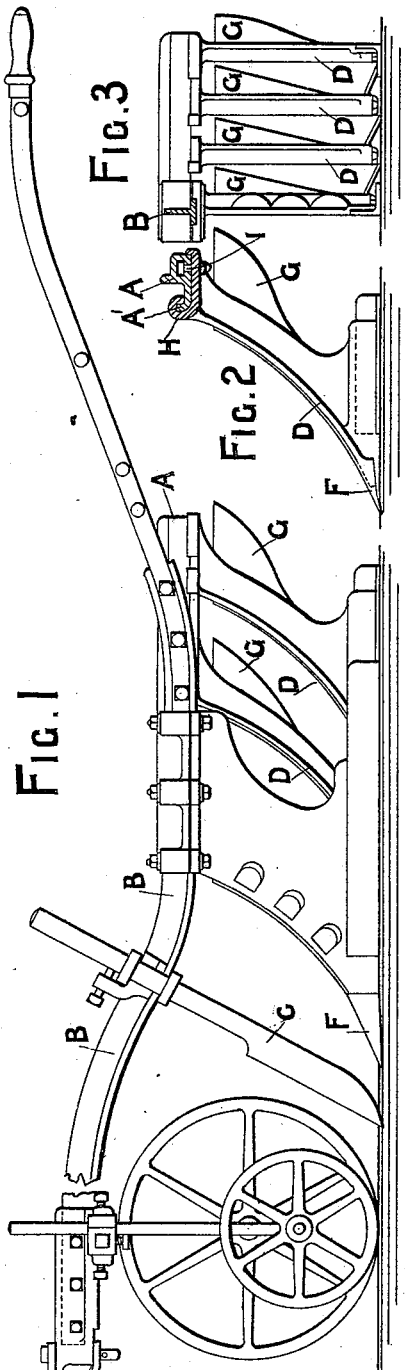
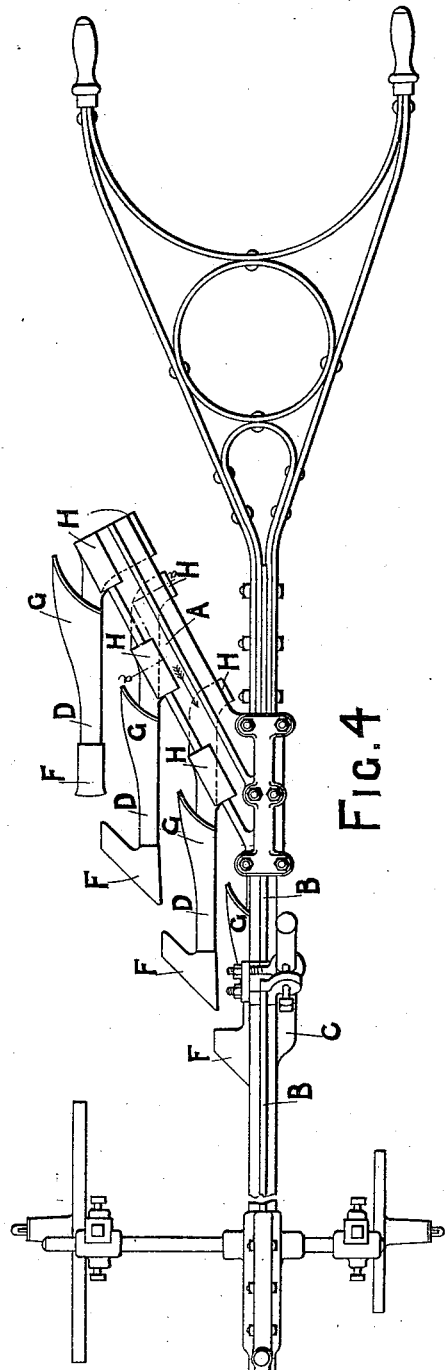
Witnesses
C. B. Bolton
A. G. Büsing
Inventor:
Henry Forman
By Richards & Co.
his Attorneys.
THE NATIONAL LITHOGRAPHING COMPANY,
WASHINGTON, D. C.

UNITED STATES PATENT OFFICE.

HENRY FORMAN, OF CHELLASTON, ENGLAND.

PLOW OR CULTIVATOR.

SPECIFICATION forming part of Letters Patent No. 521,022, dated June 5, 1894.

Application filed December 1, 1893. Serial No. 492,479. (No model.) Patented in England November 9, 1892, No. 20,184.

*To all whom it may concern:*

Be it known that I, HENRY FORMAN, a subject of the Queen of Great Britain and Ireland, and a resident of Chellaston, in the county of Derby, England, have invented certain new and useful Improvements in Plows or Cultivators, (for which I have applied for Letters Patent in the United Kingdom, the said application being numbered 20,184 and dated November 9, 1892,) of which the following is a specification.

My invention is designed to provide a new or improved fork-plow or apparatus for cultivating the ground, getting up root crops, loosening weeds or the like, or turning over the soil in a similar manner to the ordinary plow; but so breaking up and pulverizing the same that weeds may be turned over and caused to lie on the surface of the ground, thus doing the work of plowing and cultivating at one and the same time.

Another advantage gained in using my improved apparatus is that the area of ground turned up and cultivated when using my improved plow is considerably greater than the area cultivated by a plow of ordinary construction.

For the purpose of more fully describing my invention I have supplied a sheet of drawings for reference in connection with the letter press, and on which—

Figure 1 is a side elevation of my improved cultivator. Fig. 2 is a cross section on line "*a*" "*a*" through carrier bar A looking in the direction of the arrow showing the method of securing the tines thereon, the said carrier bar and tines only being illustrated on this figure. Fig. 3 is a rear elevation of the tines also showing the section of beam B. Fig. 4 is a plan of the plow or cultivator looking from above.

In carrying out my invention I provide a plow of ordinary or special construction having an adjustable or fixed colter C. The beam B which may be of I or any other suitable section is continued rearwardly so as to allow of a bar A of peculiar section such as shown in Fig. 2 to be bolted or otherwise attached thereto it being understood that this bar may be of any other section suitable for its purpose.

In place of the mold board generally used for the purpose of turning over the furrowed earth I employ an arrangement of prongs or tines D having a number of fixed or removable points F, ranging diagonally with the slipe of the ordinary plow such points following each other in echelon, the said tines being arranged and widened out and shaped as shown at G so as to turn over and thoroughly pulverize the soil or the like. The tines D are attached to the bar A (which is bent at an angle toward the rear) in the following manner:—Each tine has a lipped flange at its upper end such as H which is slid on to the bar A from the end, the lipped part engaging with a corresponding portion A' on bar A the whole being further secured by bolts I from the under side, the said bolts being passed along a slot cut or otherwise formed on the said bar A. It is evident however that I may use any other suitable means for attaching the tines to the bar A and that I may use any suitable form of points on the tines such as chisel, arrow or wing shaped, also that the said tines may be adjusted to any distance apart on the bar A to suit the various soils upon which the plow or cultivator is to be used; also that this principle may be adapted to be used with steam or other plows or cultivators, and it will be seen that my arrangement of tines may with little alteration be added to a plow of ordinary construction.

Having now particularly described and ascertained the nature of my said invention and in what manner the same is to be performed, I declare that what I claim is—

1. A plow comprising a beam and a share carried thereby and made up of a series of tines, said series inclining backwardly from the beam and forming a sectional share the sections of said share being adjustable toward and from each other, substantially as described.

2. In combination, the plow beam, the channeled bar A having a rib A' along one edge and a slot in its body portion, said bar being inclined to the plow beam and the series of tines forming a sectional share each tine having a lip to fit the rib along the edge of the channeled bar and the bolt passing through the tine shank and into slot of the said channeled bar, substantially as described.

In witness whereof I have hereunto set my hand in presence of two witnesses.

HENRY FORMAN.

Witnesses:
S. K. EDDOWES,
    Solr., Derby.
A. WINTLE,
Solicitor, Clerk to Messrs. Eddowes & Son,
    Solrs., Derby.